April 15, 1952     H. W. CLIFFORD ET AL     2,593,269
TEST FIXTURE FOR VACUUM TUBE SOCKETS
Filed Aug. 31, 1950     3 Sheets-Sheet 3
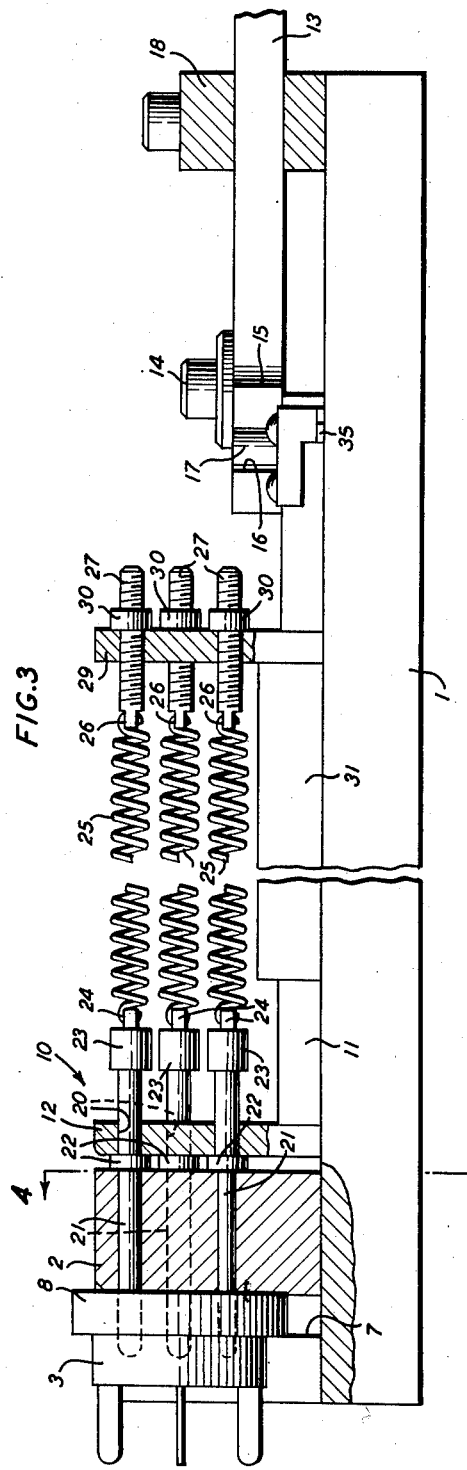
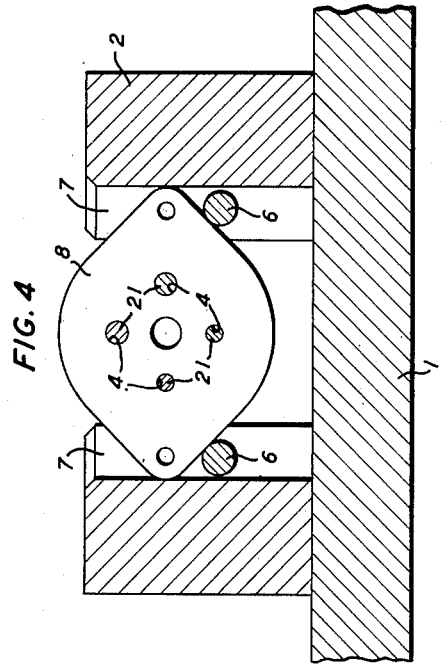
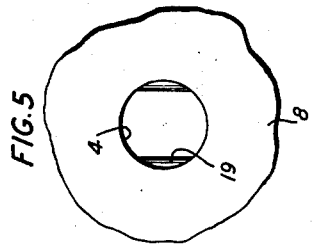
INVENTORS
R. MAC DONALD
H. W. CLIFFORD
BY
ATTORNEY Patented Apr. 15, 1952

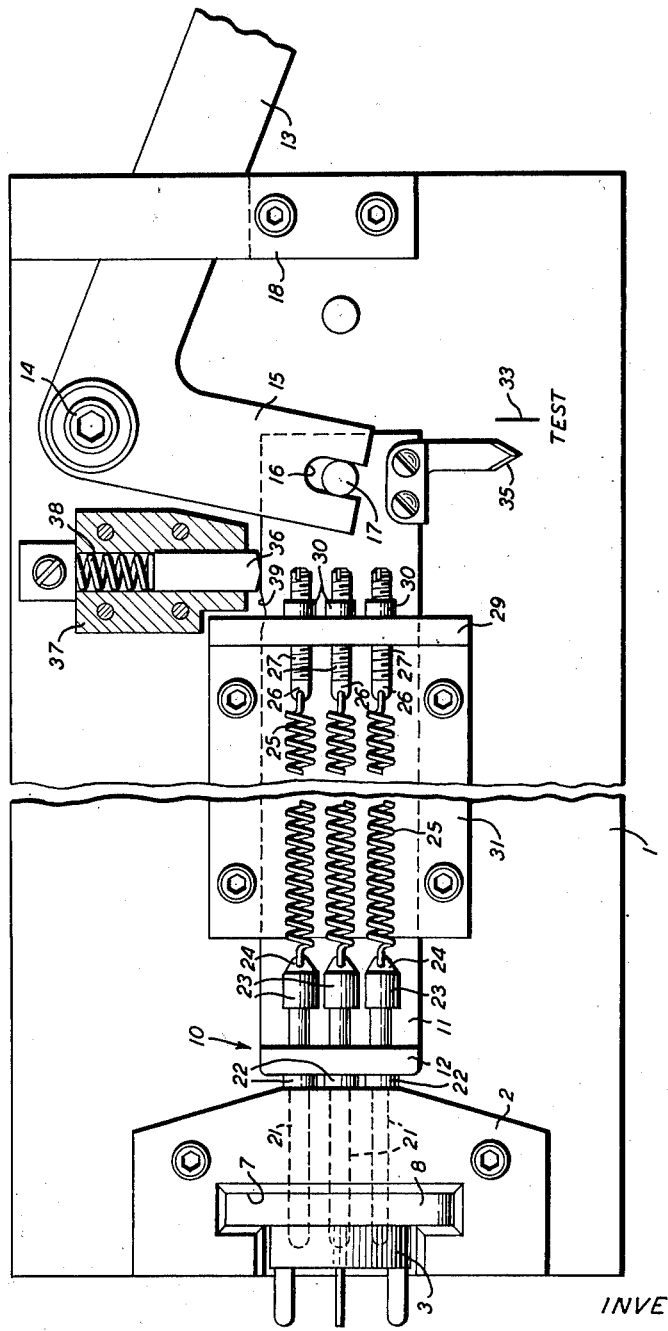

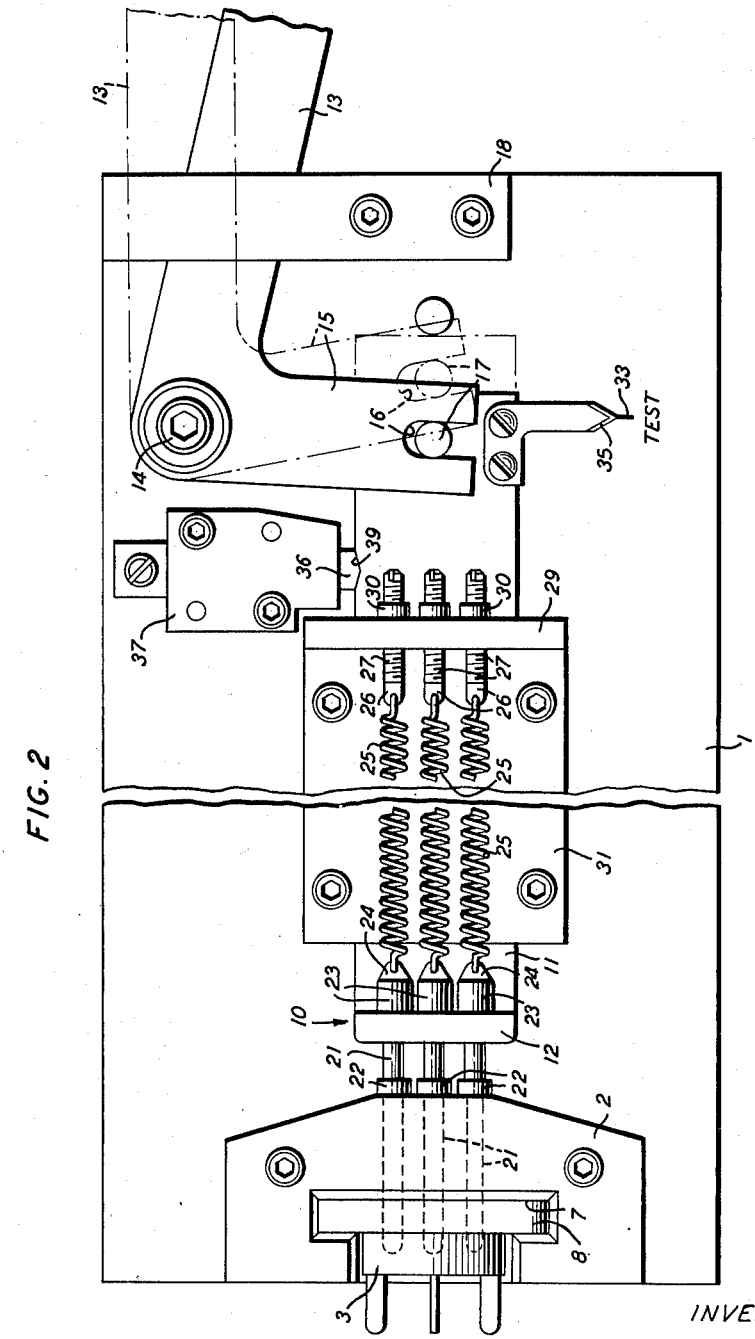

2,593,269

UNITED STATES PATENT OFFICE 2,593,269

TEST FIXTURE FOR VACUUM TUBE SOCKETS

Harry W. Clifford, East Orange, and Robert MacDonald, Maplewood, N. J., assignors to Western Electric Company, Incorporated, New York, N. Y., a corporation of New York Application August 31, 1950, Serial No. 182,530

6 Claims. (Cl. 73—9)

1

This invention relates to test fixtures for vacuum tube sockets and more particularly to mechanisms for testing the holding tension of receptacles or sockets for pin type devices such as vacuum tubes.

In connection with the manufacture of vacuum tube sockets, it is necessary to test the socket contacts to insure that they have sufficient spring tension to hold the contact pins inserted therein. In the past, it has been common practice to test the socket contacts individually to determine whether their holding pressure came up to a required minimum value. Each test became a separate hand operation with the result that testing represented an appreciable time in the manufacturing process. In addition, the test was often made by holding the socket in one hand and exerting a downward pull against the test pin in the socket by means of a suitable gravity weight. In these cases, unless the socket was held exactly vertical, the contact terminals were often bent, resulting in a defective socket.

There has therefore been a need for a device which would test the pressure of all of the contacts of a socket both simultaneously and rapidly, and it is the object of this invention to provide such a device.

Applicants accomplish this object, according to one embodiment of the invention, by providing the test fixture with a plurality of test pins corresponding to the socket terminals, the pins being freely slidable through an element of the fixture between limits defined by collars on the pins. Springs fastened to one end of the pins are loaded to a tension just below that required for the socket contacts. The vertical member is first moved against the pin collars to place the pins in engaging relationship with the socket. The member is then moved in the opposite direction, and if the tension of any of the socket jacks is below the required value, the spring of its test pin will pull the pin from the socket, thus indicating the defect.

Other objects and advantages will be apparent from the following detailed specification, taken in conjunction with the attached drawings in which:

Fig. 1 is a top plan view of the fixture showing the vertical member forcing the pins into position in the socket contacts;

Fig. 2 is a view similar to Fig. 1 showing the fixture in its test position;

Fig. 3 is a side elevational view, partly in section, of the testing device;

Fig. 4 is a sectional view of the support for the

2 test socket, taken along the line 4—4 of Fig. 3;

Fig. 5 is an enlarged view of one of the socket terminals.

With reference to the drawings, the base of the testing fixture is designated as 1. Mounted at one end of the base is a member 2 for supporting a vacuum tube socket 3 to be tested. The particular socket shown in the drawings has four socket contacts 4, these contacts being adapted to receive corresponding testing pins which simulate the pins of the apparatus with which the socket is to be used. The support 2 has a pair of projections 6 which hold the socket unit in proper testing position relative to the testing device, and a pair of recessed walls 7 which hold the socket base 8 against movement longitudinally of the test fixture.

An L-shaped platform 10 comprising a horizontal element 11 and a vertical wall-like member 12 is mounted to slide longitudinally on the device. Sliding motion is imparted to the platform 10 by an arm 13, pivoted at point 14, through an extension 15 of the arm having a recess 16 coacting with a projecting pin 17 mounted at one end of the platform 10. A guard 18 is used to stabilize the operation of the arm 13. The vertical member 12 of the platform contains a plurality of bores 20 in the same number as the contacts in the sockets to be tested, and positioned in the bores 20 are a corresponding number of test pins 21 which are shaped to fit into the contacts of the socket to be tested. These pins are held in the terminal jacks by frictional contact with springs 19 of the terminals, these springs being shown in Fig. 5. Each pin 21 has a pair of shoulders 22 and 23, the shoulders of each of the pins corresponding in position. The test pins 21 are mounted in the device so that the shoulders 22 are on one side of the vertical member 12 while the shoulders 23 are on the opposite side of the member. The pins are freely slidable in the bores 20 of the vertical member 12 except as limited by the shoulders 22 and 23.

The ends of the test pins away from the socket contacts are provided with eyelets 24 to which are fastened one end of testing springs 25. The other ends of the springs 25 are secured to apertured portions 26 of externally threaded elements 27 which are movable longitudinally in smooth surfaced apertures in a vertical member 29. The threaded elements 27 are held from movement in one direction relative to the vertical member by means of nuts 30. The vertical member 29 is part of a second L-shaped platform 31, this platform being fixed relative to the base 1, and being mounted directly over the slidable platform 10.

The springs 25 are preloaded to a tension just below the required contact pressure of the socket contacts to enable the detection of defective contacts, as later explained. This tension is made adjustable to enable various types of sockets to be tested.

In operation, the socket whose contacts are to be tested is placed in position in the support 2. The arm 13, which at this time is in its extreme counter-clockwise position is now moved clockwise as far as it will go, thus moving the platform 10 to the left. This platform movement causes the vertical member 12 to strike against the shoulders 22 of the test pins and forces these pins into the corresponding jacks of the test socket to establish a holding frictional contact between the walls of the socket contact and the test pins. The arm 13 is now moved counter-clockwise until the indicator 35, mounted on the sliding platform 10 is immediately above the line 33 marked Test. The vertical member 12 is caused by this motion to move to the right away from the shoulders 22, but still short of contact with shoulders 23.

If the frictional contact pressures of the various socket contacts equal or exceed the minimum required value, its holding force on the test pins 21 will be greater than the opposed force of the springs 25 which have been preloaded to a value just below the minimum required value. When this is the case, nothing will happen, thus indicating that the socket has passed the test. If, however, the contact pressure of any of the socket contacts is below the required value, its hold on the test pin 21 which has been inserted therein is over-balanced by the opposing force of its corresponding spring 25, and the spring will thereupon pull the particular pin to the right and out of its socket contact until the shoulder 22 of the pin strikes the vertical member 12.

It may thus be seen that by giving the arm 13 a slight turn in one direction, and then moving it in the opposite direction to the position marked Test, the operator can tell at once the test status of the contacts of a test socket, inasmuch as any defective contacts will make their presence known by allowing the test pins to fly back and strike against the vertical member 12.

After the defective socket contacts, if any, have been revealed by moving the arm 13 to the Test position, the arm is then moved to its extreme counterclockwise position which causes the vertical member 12 to strike against the shoulders 23 and break the frictional engagement of those test pins still in engagement with the socket contacts. The socket may now be removed and a new one inserted for the next test.

To assist the operator in determining when the Test position has been reached, a plunger 36 positioned in housing 37 is biased by spring 38 to urge it into a recess 39 of the sliding platform 10 when the indicator 35 is opposite the Test line 33. The end of the plunger and the recess are correspondingly shaped to enable the plunger to fit snugly into the recess, and thereby aid the operator in establishing the Test position.

Applicants' test device as described herein enables all of the contacts of a vacuum tube base to be tested quickly, simultaneously, and accurately, thereby substantially reducing the time normally required for this test.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a mechanism for testing the holding pressure of socket contacts, the combination with a base and a support mounted on the base for positioning the socket, of a set of test pins corresponding in number to the contacts to be tested, said contacts being adapted to receive the pins in frictional engagement, means for bringing the pins into such engagement with the contacts, and spring means for each pin, adapted to exert a pull upon the pins approximately equal to a required value for the frictional holding force.

2. In a mechanism for testing the holding pressure of socket contacts, the combination with a base and a support mounted on the base for positioning the socket, of a set of test pins corresponding in number to the contacts to be tested, said contacts being adapted to receive the pins in frictional engagement, means for bringing the pins into such engagement with the contacts, said means including a movable member having bores therein for positioning the test pins, a set of shoulders formed on the test pins and an arm coacting with the member to move it against the shoulders, and spring means for each pin, adapted to exert a pull upon the pins approximately equal to a required value for the frictional holding force.

3. In a mechanism for testing the holding pressure of socket contacts, the combination with a base and a support mounted on the base for positioning the socket, of a set of test pins corresponding in number to the contacts to be tested, said contacts being adapted to receive the pins in frictional engagement, means for bringing the pins into such engagement with the contacts, and resilient means, one for each pin, connected at one end to its test pin and at its other end to the base for exerting a force against the pins approximately equal to a required value for the frictional holding force and opposite in direction to such force.

4. In a mechanism for testing the holding pressure of socket contacts, the combination with a base and a support mounted on the base for positioning the socket, of a set of test pins corresponding in number to the contacts to be tested, said contacts being adapted to receive the pins in frictional engagement, means for bringing the pins into such engagement with the contacts, said means including a movable member having bores therein for positioning the test pins, a set of shoulders formed on the test pins and an arm coacting with the member to move it against the shoulders, and resilient means, one for each pin, connected at one end to its test pin and at its other end to the base for exerting a force against the pins approximately equal to a required value for the frictional holding force and opposite in direction to such force.

5. In a mechanism for testing the holding pressure of socket contacts, the combination with a base and a support mounted on the base for positioning the socket, of a set of test pins corresponding in number to the contacts to be tested, said contacts being adapted to receive the pins in frictional engagement, means for bringing the pins into such engagement with the contacts, said means including a movable member having bores therein for positioning the test pins, a set of shoulders formed on the test pins and an arm coacting with the member to move it against the shoulders, means exerting a force against the pins approximately equal to a required value for the frictional holding force and opposite in direction to such force, and a second set of shoulders formed on the pins on the opposite side of the movable member from the first set to effect removal of the pins from engagement with the contacts.

6. In a mechanism for testing the holding tension of electrical socket contacts, a support for holding devices having socket contacts to be tested, a plurality of pins simulating the pins of apparatus to be held by the contacts, a member slidably supporting the pins in alignment with the contacts, means operable selectively to force the pins into the contacts or to withdraw the pins therefrom, and spring means for each pin, adapted to exert a pull upon each pin tending to withdraw the pin from its contact.

HARRY W. CLIFFORD.
ROBERT MacDONALD.

REFERENCES CITED

The following references are of record in the file of this patent:

UNITED STATES PATENTS

| Number | Name | Date |
| --- | --- | --- |
| 1,336,543 | Stull | Apr. 13, 1920 |
| 1,961,368 | Larson | June 5, 1934 |
| 2,077,510 | Boehler et al. | Apr. 20, 1937 |
| 2,483,867 | Anderson et al. | Oct. 4, 1949 |

FOREIGN PATENTS

| Number | Country | Date |
| --- | --- | --- |
| 374,731 | Germany | Apr. 27, 1923 |